US008251593B2

(12) United States Patent
Liao et al.

(10) Patent No.: US 8,251,593 B2
(45) Date of Patent: Aug. 28, 2012

(54) CONNECTOR HAVING AN FLOATABLE OPTICAL MODULE

(75) Inventors: Chi-Nan Liao, Tu-Cheng (TW); Qi-Sheng Zheng, Kunshan (CN); Jia-Yong He, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 271 days.

(21) Appl. No.: 12/770,748

(22) Filed: Apr. 30, 2010

(65) Prior Publication Data

US 2010/0278490 A1    Nov. 4, 2010

(30) Foreign Application Priority Data

Apr. 30, 2009    (CN) .......................... 2009 1 0302057

(51) Int. Cl.
  G02B 6/36      (2006.01)
  H01R 33/945    (2006.01)
  H04B 10/00     (2006.01)
(52) U.S. Cl. .............. 385/90; 385/92; 385/53; 385/101; 385/99; 385/76; 439/577; 398/139
(58) Field of Classification Search .................... 385/53, 385/77, 78, 88, 89, 90, 92, 101; 398/135, 398/138, 139; 439/577
See application file for complete search history.

(56) References Cited

U.S. PATENT DOCUMENTS

| 7,099,550 | B1 * | 8/2006 | Too .............................. 385/134 |
| 7,896,559 | B2 * | 3/2011 | Yi et al. .......................... 385/75 |
| 2010/0278490 | A1 * | 11/2010 | Liao et al. ....................... 385/90 |
| 2011/0091160 | A1 * | 4/2011 | He et al. .......................... 385/74 |
| 2011/0142399 | A1 * | 6/2011 | Little et al. ...................... 385/76 |
| 2012/0076462 | A1 * | 3/2012 | Wu ................................ 385/89 |

FOREIGN PATENT DOCUMENTS

| CN | 100432725 C | 11/2008 |
| WO | 2008121731 | 10/2008 |

* cited by examiner

*Primary Examiner* — Brian Healy
(74) *Attorney, Agent, or Firm* — Wei Te Chung; Andrew C. Cheng; Ming Chieh Chang

(57) ABSTRACT

A connector (100) includes an insulative housing (1) having a receiving slot (121) formed therein; a set of contacts (2) retained in the insulative housing; an optical module (3) for transmitting optical data and being movably received in the receiving slot along a front-to-back direction; a resilient member (4) for urging the optical module moving forwardly in the receiving slot; a stopping device (124,125) for orientating the optical module backwardly and sidewardly; a resisting device (75) for orientating the optical module along a height direction of the insulative housing; and a metal shell (7,8) shielding the insulative housing.

17 Claims, 10 Drawing Sheets

CONNECTOR HAVING AN FLOATABLE OPTICAL MODULE

BACKGROUND OF THE INVENTION

1. Field of the Invention

The present invention relates to a connector, more particularly to a connector having an optical module for transmitting optical data.

2. Description of Related Art

At present, Universal Serial BUS (USB) is a widely used input/output interface adapted for many electronic devices, such as personal computer and related peripherals. In 1994, Intel, HP, IBM, NEC etc. together founded USB-IF to define a spec of USB. Nowadays, USB-IF has published several editions for USB, and transmitting rate of USB has becomes higher and higher. As development of electronic industry, higher transmitting rate of USB based connection accessory is needed.

An optical universal serial bus (OUSB) has been disclosed to be adopted for optical data transmission. The OUSB includes a USB connector with a number lenses embedded in the USB connector and further connected with respective fibers for transmitting optical signal. Therefore, the OUSB can transmit signals up to 10 Gbps. However, as the lens are fixed to the USB connector, and they may fail to mate with counterparts if excessive clearance exits in manufacturing process.

Hence, an improved connector with a floatable optical module is desired to overcome the above problems.

BRIEF SUMMARY OF THE INVENTION

According to one aspect of the present invention, a connector comprises an insulative housing having a receiving slot formed therein; a plurality of contacts retained in the insulative housing; an optical module for transmitting optical data and being movably received in the receiving slot along a front-to-back direction; a resilient member for urging the optical module moving forwardly in the receiving slot; a stopping device for orientating the optical module backwardly and sidewardly; a resisting device for orientating the optical module along a height direction of the insulative housing; and a metal shell shielding the insulative housing.

According to another aspect of the present invention, a cable assembly for mating with a receptacle comprises an insulative housing defining a mating portion with a tongue portion extending in said mating portion, the tongue portion defining a receiving slot in an upper side thereof; a plurality of contacts retained in the insulative housing and comprising contacting portions disposed on a lower side of the tongue portion for electrically mating with the receptacle in a vertical direction; an optical module for optically mating with the receptacle in a front-to-back direction and being movably received in the receiving slot along the front-to-back direction; a resilient member for urging the optical module moving forwardly in the receiving slot; a stopping device for orientating the optical module in the front-to-back direction and a transverse direction perpendicular to the front-to-back direction; a resisting device for orientating the optical module in the vertical direction; and a metal shell enclosing the tongue portion and the optical module.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
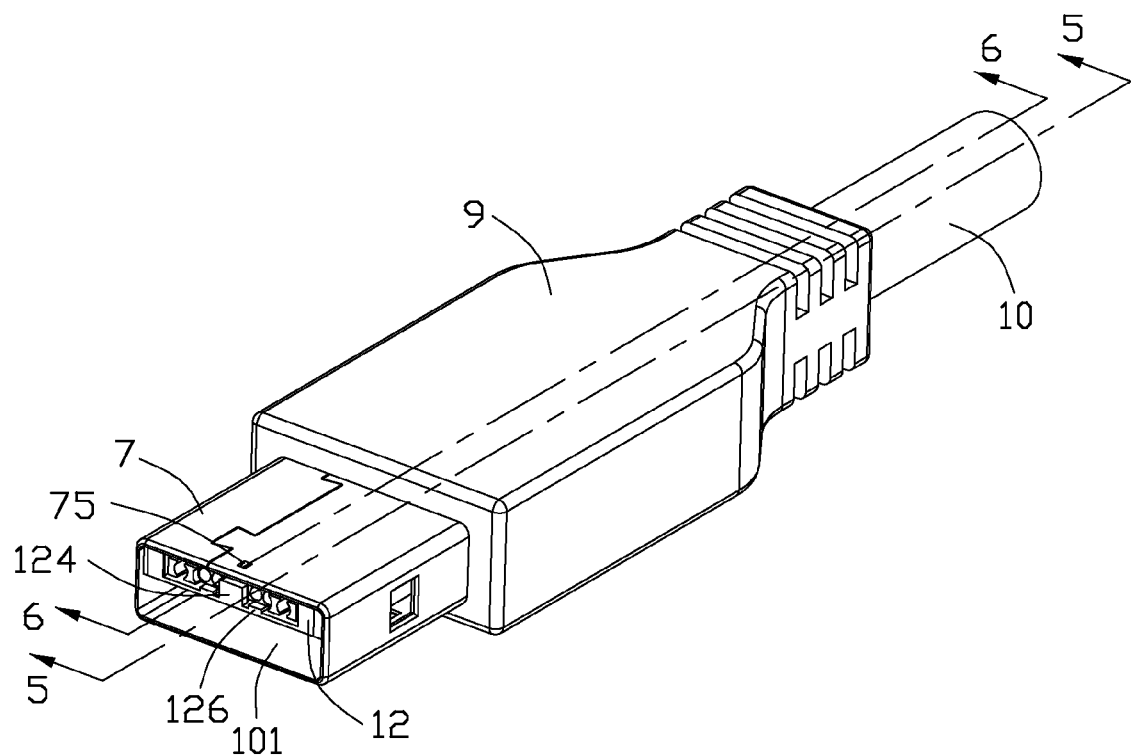
FIG. 1 is an assembled, perspective view of a connector according to an embodiment of the present invention.
Figure 2:
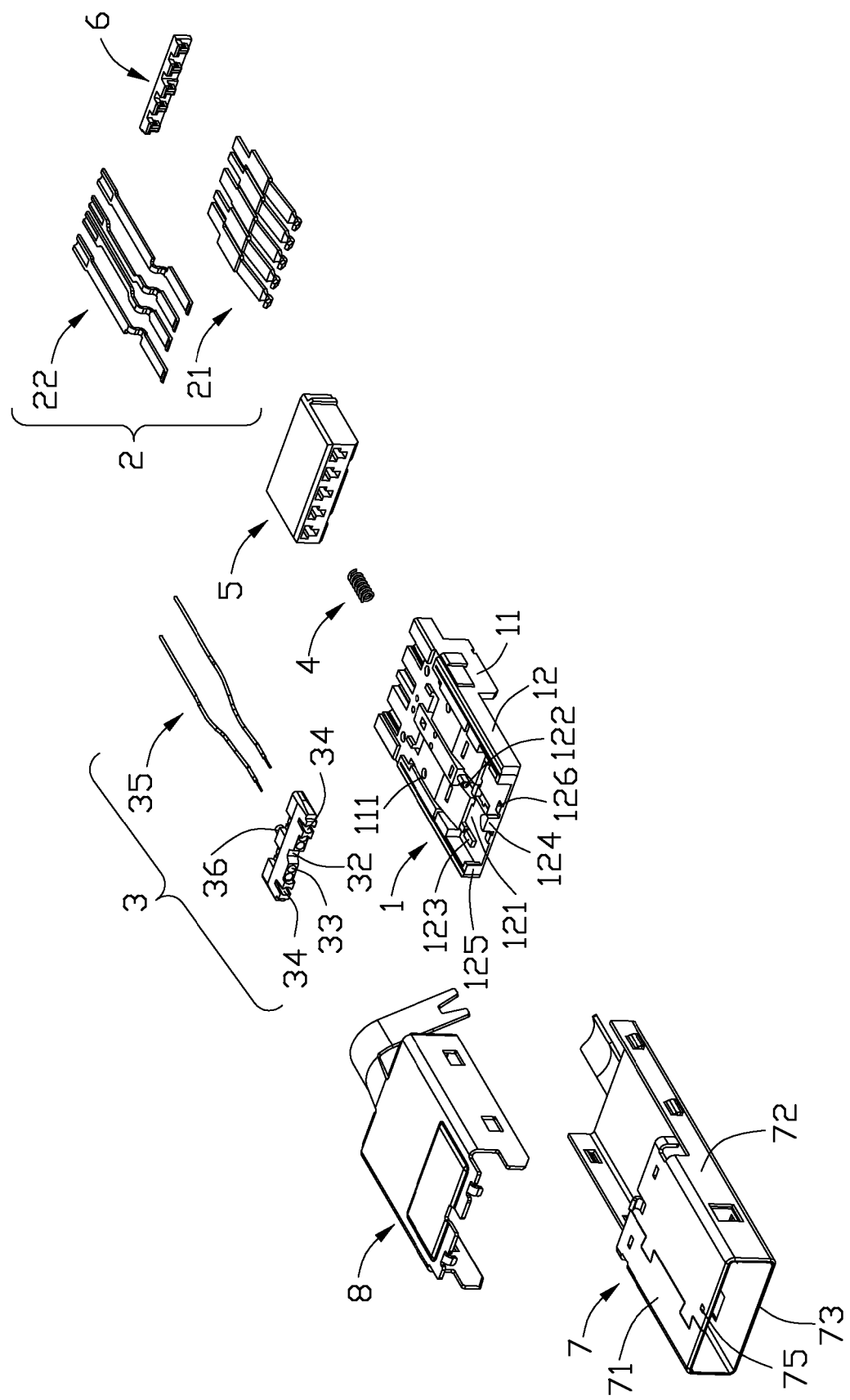
FIG. 2 is a partly exploded perspective view of the connector shown in FIG. 1.
Figure 3:
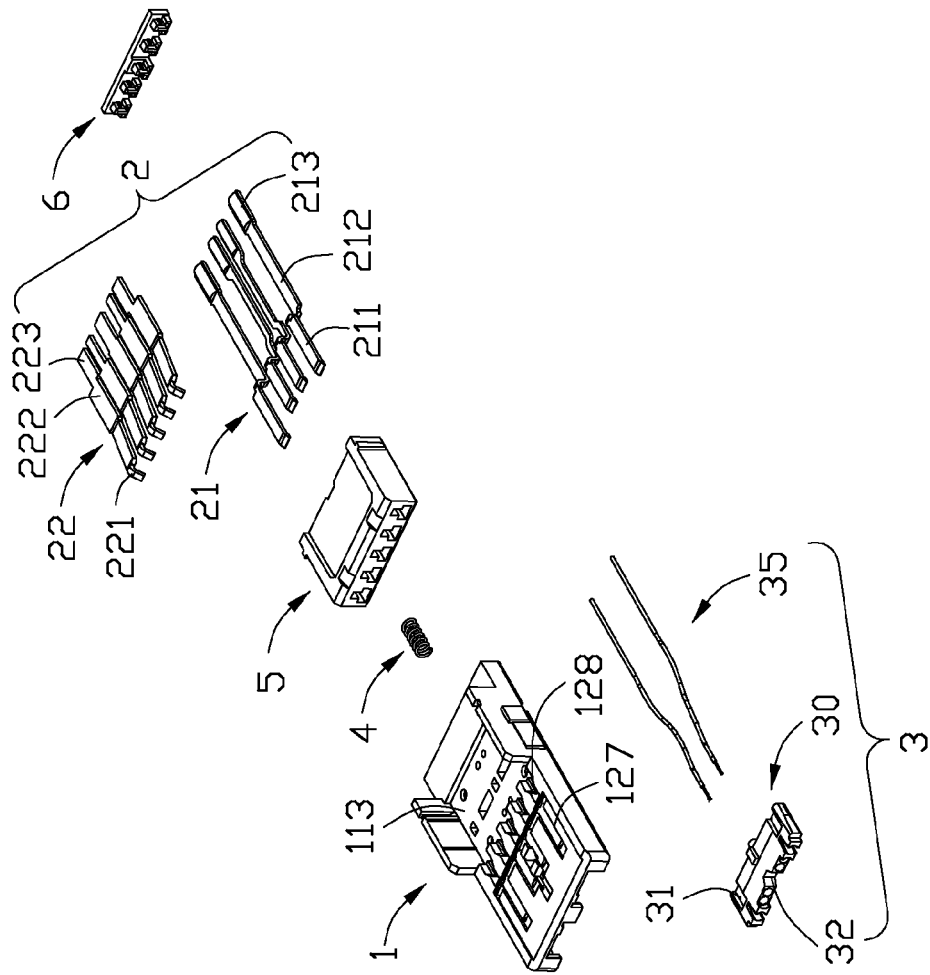
FIG. 3 is similar to FIG. 2, but viewed from another aspect.
Figure 3:
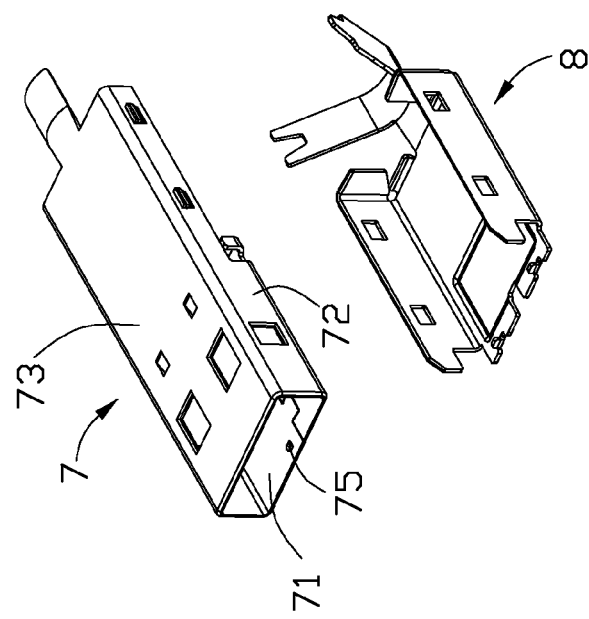
Figure 4:
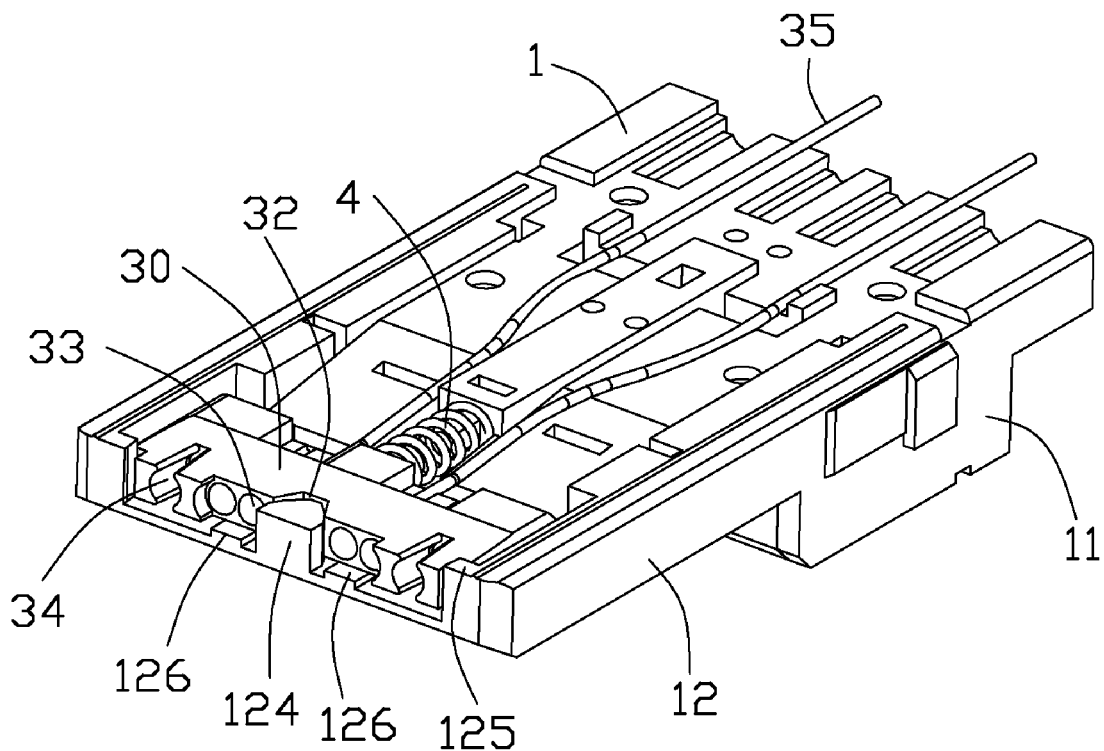
FIG. 4 is a partially assembly view of the connector shown in FIG. 1.
Figure 5:
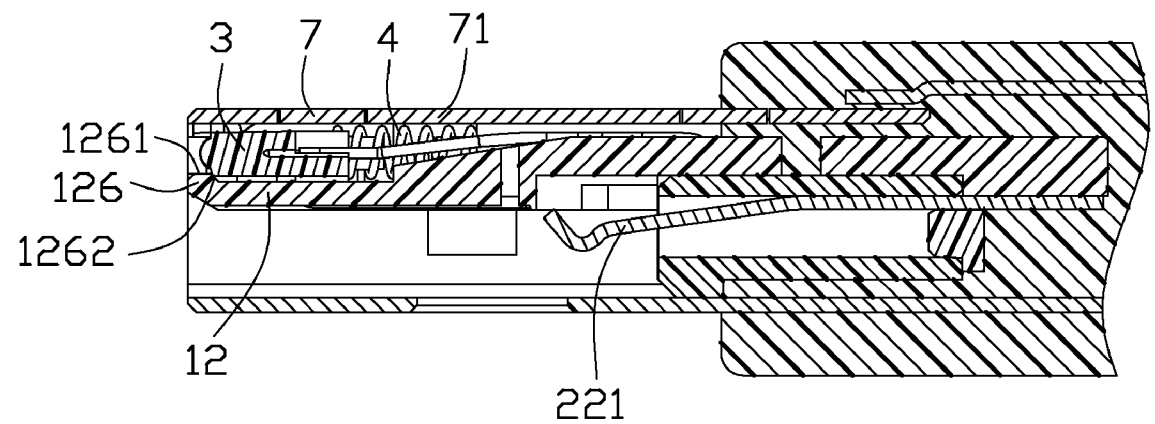
FIG. 5 is a cross-sectional view of the connector taken along line 5-5 shown in FIG. 1.
Figure 6:
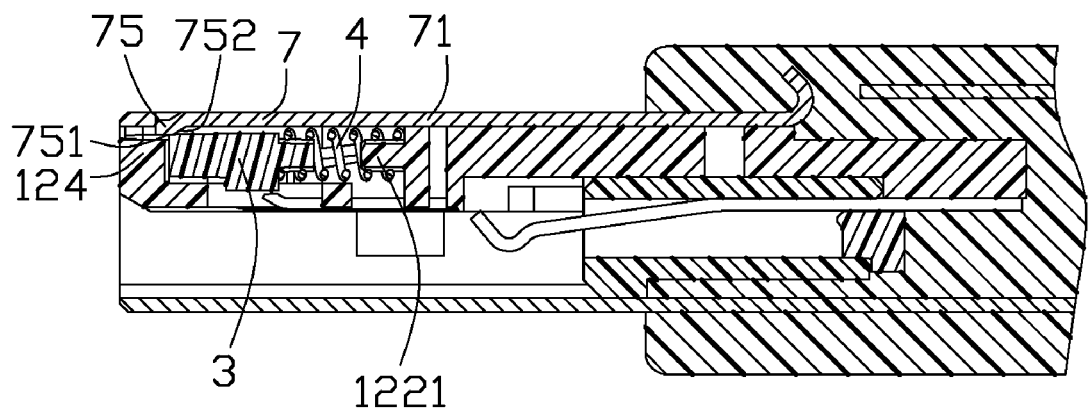
FIG. 6 is a another cross-sectional view of the connector taken along line 6-6 shown in FIG. 1.
Figure 7:
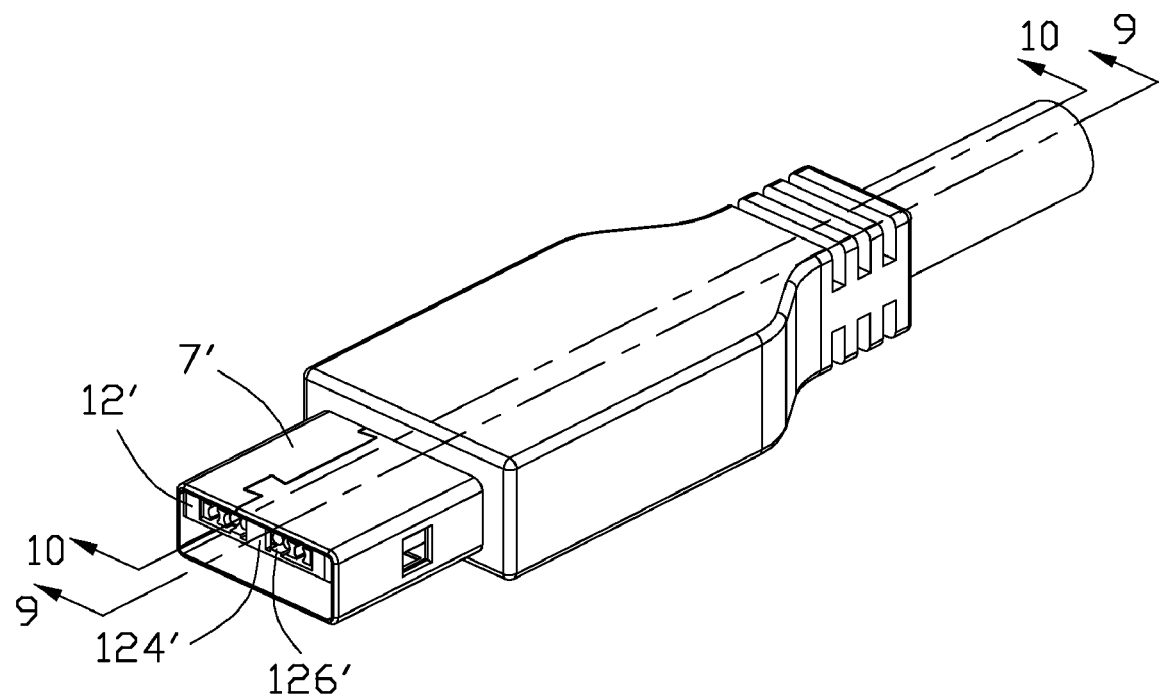
FIG. 7 is an assembled, perspective view of a connector according to another embodiment of the present invention.
Figure 8:
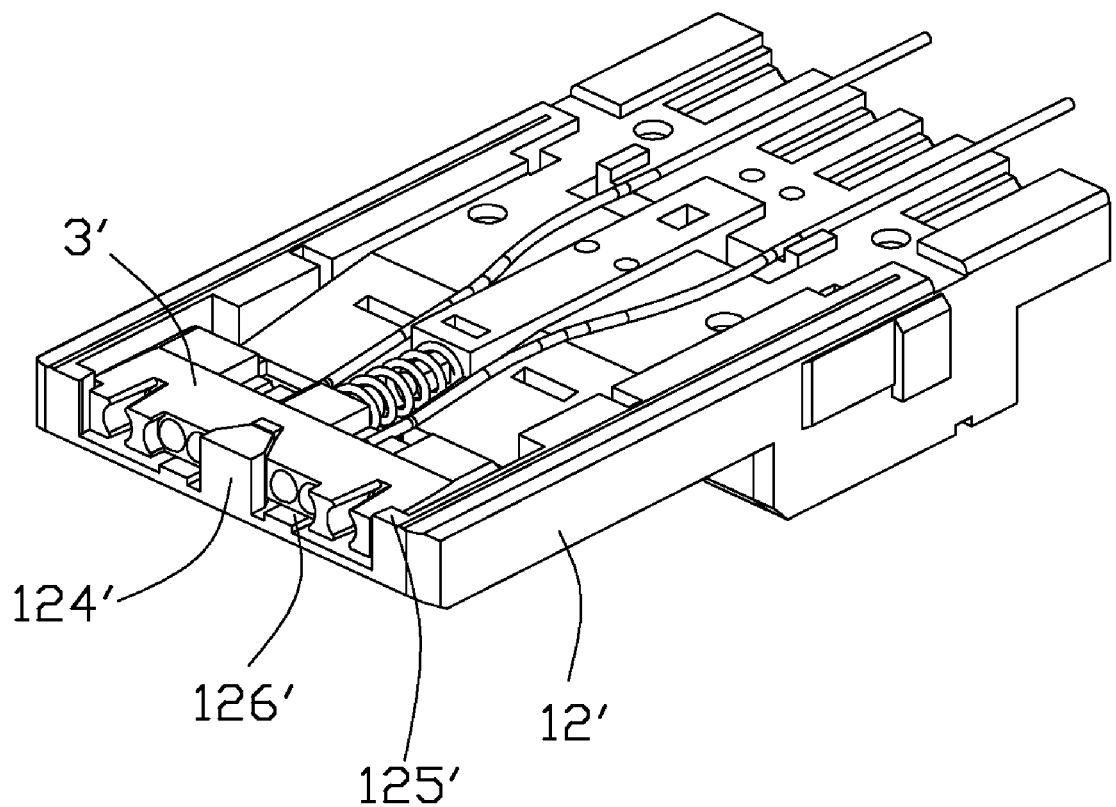
FIG. 8 is a partially assembly view of the connector shown in FIG. 7.
Figure 9:
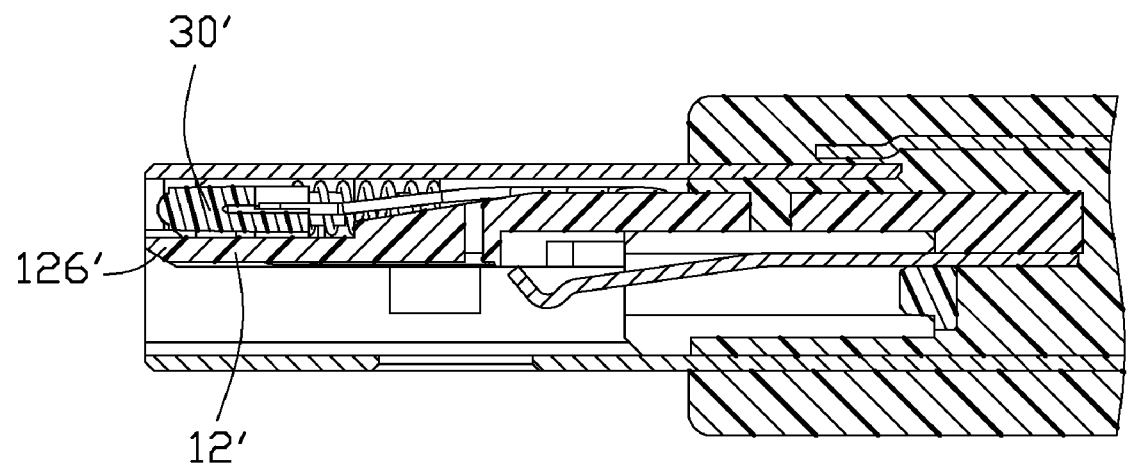
FIG. 9 is a cross-sectional view of the connector taken along line 9-9 shown in FIG. 7.
Figure 10:
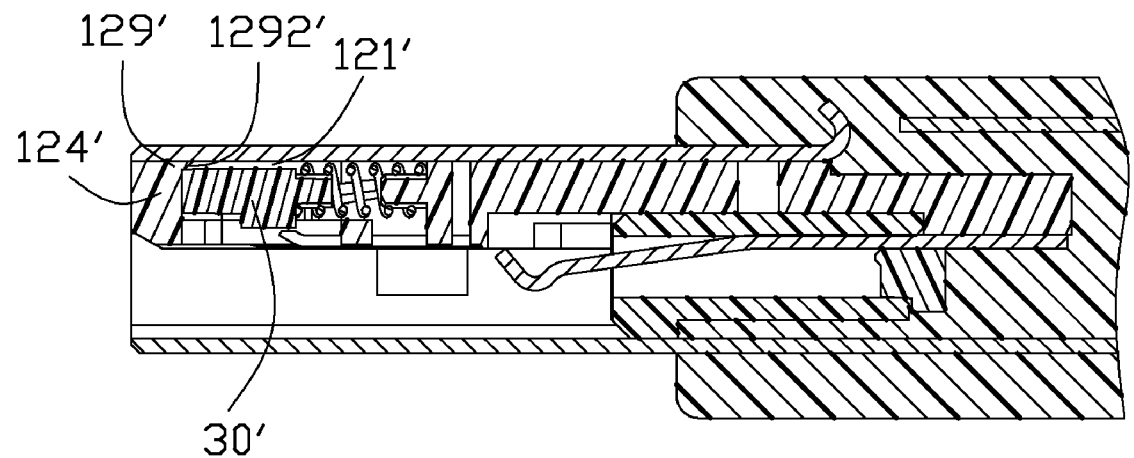
FIG. 10 is a another cross-sectional view of the connector taken along line 10-10 shown in FIG. 7.

Referring to FIGS. 1-3, A connector 100 according to the present invention of a first embodiment is a cable assembly and comprises an insulative housing 1, a set of contacts 2 attached to the insulative housing 1, an optical module 3 for transmitting optical data and being coupled to the insulative housing 1, a resilient member 4 for urging the optical module 3 moving forwardly, a spacer 5 retained in the insulative housing 1, an insulator 6 for engaging with the spacer 5, a first metal shell 7 and a second metal shell 8 shielding the insulative housing 1, a plastic case 9 surrounding the first and second metal shell 7, 8, and a cable for electrical connection to the contacts 2. In this embodiment, the resilient member 4 is a compression coil spring 4, in other embodiments, the resilient member 4 could be one or two torsion coil springs or resilient metal pieces.

Referring to FIG. 1-6, The insulative housing 1 defines a mating portion 101, and includes a base portion 11 and a tongue portion 12 extending forwardly from a front end of the base portion 11 into the mating portion 101. The insulative housing 1 has a pair of fiber grooves 111 formed on an upper surface thereof and extending on the tongue portion 12 and the base portion 11. The base portion 11 has a depression 113 recessed upwardly from a lower surface thereof for retaining the spacer 5. The tongue portion 12 has a receiving slot 121 recessed downwardly from an upper surface thereof, a cavity 122 at back of the receiving slot 121 and communicating with the receiving slot 121 for receiving the resilient member 4, and a first post 1221 extending forwardly into the receiving slot 121 for retaining the compression coil spring 4. A pair of blocks 123 are formed on the tongue portion 12 and extend in the receiving slot 121. The tongue plate 12 has a V-shaped first stopping portion 124 located at front and midst of the receiving slot 121, a pair of second stopping portions 125 located at front and two sides of the receiving slot 121, and a pair of protrusions 126 formed at two lateral sides of the first stopping portion 124 and between the second stopping portions 125. The V-shaped first stopping portion 124 gradually reduces from a widest front end to a narrowest back end. The protrusion 126 protrudes upwardly into the receiving slot 121 and defines a top face 1261, and a slanted face 1262 extending backwardly and slanting downwardly from the top face 1261. A set of first passageways 127 and a set of second passageways 128 are formed at a lower surface of the tongue portion 12 in a condition that the first passageways 127 are arranged in a front row along a transverse direction and the second passageway 128 are arranged in a back row perpendicular to the front row.

Referring to FIGS. 2 to 3, the contacts 2 are adapted for USB 3.0 protocol, and include a number of first contacts 21 and a number of second contacts 22. The first contacts 21 are adapted for USB 2.0 protocol and each includes a stiff first contacting portion 211 retained in the first passageway 127, a first tail portion 213 for electrical connection to the cable 10, and a first connecting portion 212 connecting the first contacting portion 211 and the first tail portion 213 and being retained in the base portion 11. The second contacts 22 include two pair of differential contacts and a grounding contact located between the two pair of differential contacts. Each second contact 22 includes a resilient second contacting portion 221 received in the second passageway 128, a second tail portion 223 for electrical connection to the cable 10, and a second connecting portion 222 connecting the second contacting portion 221 and the second tail portion 223 and being retained in the spacer 5. The insulator 6 is retained in the spacer 5 to retain the second contacts 22 in the spacer 5 firmly. In this embodiment, the first contacts 21 are assembled to the insulative housing 1, the second contacts 22 are assembled to the spacer 5 and form as a module so as to be assembled to the insulative housing 1, in other embodiment, the first contacts 21 could be insert molded into the insulative housing 1, the second contacts 22 could be inserted molded with the spacer 5 and form as a module so as to be assembled to the insulative housing 1.

Referring to FIGS. 1-6, the optical module 3 comprises a main body 30 being movably received in the receiving slot 121 along a front-to-back direction which is perpendicular to the transverse direction, and a pair of fibers 35 attached to the main body 30 and received in the fiber grooves 111. The main body 30 has a pair of sliding slots 31 formed at a lower surface thereof for sliding on the blocks 124 along the front-to-back direction, a V-shaped slot 32 recessed backwardly from a front face thereof and fitted in with the V-shaped first stopping portion 124, a set of lenses 33 attached to the main body 30 and located at two lateral sides of the V-shaped slot 32 for optically coupling with the fibers 35, and a pair of retaining holes 34 formed thereon and located at two lateral sides of the lenses 33 for accommodating a pair of columniations on a complementary receptacle so as to align the lenses 33 with lenses on the receptacle and transmit optical data therebetween reliably. A second post 36 protrudes backwardly from the main body 30 so as to be received in the compression coil spring 4. Therefore, the optical module 3 could be biased forwardly by the compression coil spring 4.

Referring to FIGS. 2-6, the first metal shell 7 includes a pair of opposed top wall 71 and bottom wall 73, and a pair of side walls 72 connecting the top wall 71 and the bottom wall 73. The top wall 71 has a projection 75 projecting downwardly therefrom for abutting against the main body 30 downwardly. The projection 75 has an oblique face 752 extending downwardly and slanting forwardly to guide the main body 30 moving forwardly in the receiving slot 121, and a horizontal face 751 extending horizontally forwardly from the oblique face 752 for abutting against an upper face of the main body 30 downwardly to retain the main body 30 in the receiving slot 121.

When the connector 100 is inserted into the complementary receptacle for mating with the receptacle, the optical module 3 is pushed backwardly by the receptacle and moves backwardly in the receiving slot 121. When the connector 100 is extracted out from the complementary receptacle, the optical module 3 is biased forwardly by the compression coil spring 4 and moves forwardly in the receiving slot 121, the oblique face 752 and the slanted face 1262 guide the main body 30 moving forwardly in the receiving slot 121, the V-shaped first stopping portion 124 fits in with the V-shaped slot 32 for resisting the optical module 3 backwardly and sidewardly so as to prevent the optical module 3 moving in the front-to-back and transverse direction, the second stopping portions 125 abut against the front face of the main body 30 to prevent the optical module 3 moving forwardly, the horizontal face 751 of the projection 75 abuts against the main body 30 downwardly and the top face 1261 of the protrusions 126 abut against the main body 30 upwardly so as to retain the optical module 3 therebetween. Therefore, the first stopping portion 126 and the second stopping portions 125 present as a stopping device for orientating the optical module 3 in the front-to-back and the transverse direction, the protrusions 126 and the projection 75 present as a resisting device for orientating the optical module 3 in a height direction of the connector 100, the optical module 3 will be orientated on its original position firmly and accurately, and the optical data will be transmitted between the connector and the receptacle reliably.

Referring to FIG. 7-10, in a second embodiment of the present invention, the first stopping portion 124' of the tongue portion 12' has a resisting portion 129' protruding backwardly from an upper end thereof for abutting against the main body 30' downwardly. The resisting portion 129' has a slanted guiding face 1292' for guiding the main body 30' moving forwardly in the receiving slot 121'. In the second embodiment, the resisting portion 129' of the first stopping portion 124' and the protrusions 126' of the tongue portion 12' abut against the main body 30' upwardly and downwardly so as to retain the optical module 3' therebetween, there is no need to provide a projection 75 projecting from the shell 7' to abut against the main body 30' downwardly. In other embodiments, the resisting portions 129' could be formed on the second stopping portion 125'.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A connector comprising:
an insulative housing having a receiving slot formed therein;
a plurality of contacts retained in the insulative housing;
an optical module for transmitting optical data and being movably received in the receiving slot along a front-to-back direction;
a resilient member for urging the optical module moving forwardly in the receiving slot;
a stopping device for orientating the optical module backwardly and sidewardly;
a resisting device for orientating the optical module along a height direction of the insulative housing; and
a metal shell shielding the insulative housing.

2. The connector according to claim 1, wherein the stopping device comprises a V-shaped first stopping portion located at front and midst of the receiving slot, the V-shaped first stopping portion gradually reduces from a widest front end to a narrowest back end, the optical module has a V-shaped slot recessed backwardly from a front face thereof for accordantly accommodating the V-shaped first stopping portion.

3. The connector according to claim 2, wherein the resisting device comprises a resisting portion protruding backwardly from an upper end of the V-shaped first stopping portion for abutting against the optical module downwardly.

4. The connector according to claim 2, wherein the stopping device comprises a pair of second stopping portions located at two lateral sides of the V-shaped first stopping portion for abutting against the front face of the optical module.

5. The connector according to claim 1, wherein the resisting device comprises a pair of protrusions located at front of the receiving slot and protruding upwardly towards the receiving slot for abutting against a lower face of the optical module upwardly.

6. The connector according to claim 4, wherein the protrusion defines a top face for abutting against the lower face of the optical module, and a slanted face extending backwardly and slanting downwardly from the top face for guiding the optical module moving forwardly.

7. The connector according to claim 1, wherein the shell has a top wall for covering an upper face of the optical module, the resisting device comprises a projection projecting downwardly from the top wall for abutting against an upper face of the optical module downwardly.

8. The connector according to claim 7, wherein the projection defines an oblique face extending downwardly and slanting forwardly for guiding the optical module moving forwardly, and a horizontal face extending horizontally forwardly from the oblique face for abutting against the upper face of the optical module.

9. The connector according to claim 1, wherein the resilient member is a compression coil spring or a torsion coil spring or a resilient metal piece.

10. The connector according to claim 1, wherein the insulative housing comprises a base portion and a tongue portion extending forwardly from the base portion, the receiving slots is recessed downwardly from an upper surface of the tongue portion, the contacts are adapted for USB 3.0 protocol and comprises contacting portions attached to a lower surface of the tongue portion.

11. The connector according to claim 1, wherein the optical module comprises a main body for being movably received in the receiving slot, a plurality of lenses attached to the main body, and a plurality of fibers for optically coupling with the lenses.

12. A cable assembly for mating with a receptacle comprising:
an insulative housing defining a mating portion with a tongue portion extending in said mating portion, the tongue portion defining a receiving slot in an upper side thereof;
a plurality of contacts retained in the insulative housing and comprising contacting portions disposed on a lower side of the tongue portion for electrically mating with the receptacle in a vertical direction;
an optical module for optically mating with the receptacle in a front-to-back direction and being movably received in the receiving slot along the front-to-back direction;
a resilient member for urging the optical module moving forwardly in the receiving slot;
a stopping device for orientating the optical module in the front-to-back direction and a transverse direction perpendicular to the front-to-back direction;
a resisting device for orientating the optical module in the vertical direction; and
a metal shell enclosing the tongue portion and the optical module.

13. The cable assembly according to claim 12, wherein the stopping device comprises a V-shaped first stopping portion extending upwardly from the tongue portion and being located at front of the receiving slot, the V-shaped first stopping portion gradually reduces from a widest front end to a narrowest back end, the optical module has a V-shaped slot recessed backwardly from a front face thereof for accordantly accommodating the V-shaped first stopping portion.

14. The cable assembly according to claim 13, wherein the resisting device comprises a resisting portion protruding backwardly from an upper end of the V-shaped first stopping portion for abutting against an upper face of the optical module downwardly.

15. The cable assembly according to claim 12, wherein the resisting device comprises a pair of protrusions protruding upwardly from the tongue portion towards the receiving slot and located at front of the receiving slot for abutting against a lower face of the optical module upwardly.

16. The cable assembly according to claim 15, wherein the shell has a top wall for covering an upper face of the optical module, the resisting device comprises a projection projecting downwardly from the top wall for abutting against an upper face of the optical module downwardly, the optical module is sandwiched between the projection and protrusions in the vertical direction.

17. A cable connector assembly comprising:
an insulative housing including a mating tongue defining opposite first and second faces thereon;
a plurality of electrical contacts disposed in the housing with contacting sections exposed upon the first face;
an optical module disposed upon the second face and movable relative to the housing in a front-to-back direction;
a spring device located behind the optical module to constantly urge the optical module forwardly; and
a rearward first wedge structure formed on a front portion of the housing, and a forward second wedge structure formed on a front edge region of the optical module and in alignment with the rearward first wedge structure for compliant engagement with the rearward first wedge structure when said optical module is forwardly pushed to a foremost position by said spring device; wherein via engagement between the first wedge structure and the second wedge structure, the optical module is precisely orientated in the housing in a transverse direction perpendicular to both said front-to-back direction and a vertical direction along which the optical module is assembled into the housing.

* * * * *